(12) United States Patent
Irvin

(10) Patent No.: US 6,418,211 B1
(45) Date of Patent: Jul. 9, 2002

(54) ADAPTIVE CALL SCREENING METHOD

(75) Inventor: David R. Irvin, Raleigh, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/221,367

(22) Filed: Dec. 28, 1998

(51) Int. Cl.⁷ .............................................. H04M 3/00
(52) U.S. Cl. .................... 379/188; 379/189; 379/199; 379/210.01; 379/211.01
(58) Field of Search ................... 379/67.1, 142.01, 379/142.08, 142.17, 205.1, 202.01, 207.13, 209.01, 214.01, 188, 199, 189, 210.01, 211.01

(56) References Cited

U.S. PATENT DOCUMENTS

| | | | | |
|---|---|---|---|---|
| 5,070,525 A | * | 12/1991 | Szlam et al. ............... | 379/196 |
| 5,109,408 A | * | 4/1992 | Greenspan et al. ......... | 379/197 |
| 5,329,578 A | * | 7/1994 | Brennan et al. ........ | 379/211.03 |
| 5,475,747 A | * | 12/1995 | Bales et al. .................. | 379/201 |
| 5,848,142 A | * | 12/1998 | Yaker .......................... | 379/215 |
| 6,005,870 A | * | 12/1999 | Leung et al. ................ | 370/466 |
| RE37,073 E | * | 2/2001 | Hammond ................... | 379/67 |

* cited by examiner

Primary Examiner—Ahmad F. Matar
Assistant Examiner—Bing Bui
(74) Attorney, Agent, or Firm—Coats & Bennett, P.L.L.C.

(57) ABSTRACT

A telephone having call-screening capabilities includes a memory for storing call-screening data. The call-screening data is used by the telephone to screen incoming calls. Incoming calls can be accepted, rejected, or diverted based on the call-screening data stored in memory. The call-screening data is automatically updated when a call is made to a previously screened number provided that certain pre-determined conditions are satisfied, so that calls can be received from the previously screened number. Updates may be made, for example, when the call to the previously screened number is unanswered, when it is diverted to a recording device, or when the call is made to a number from which a previously screened call was made. The phone can be programmed so that updates automatically expire after a predetermined time period has elapsed.

23 Claims, 7 Drawing Sheets

ADAPTIVE CALL SCREENING METHOD

FIELD OF THE INVENTION

The present invention relates generally to special calling features for telephones, such as call screening, call forwarding, call waiting, etc. and, more particularly, to an adaptive call-screening method that automatically updates a call-screening database based on actions of the calling party and called party.

BACKGROUND OF THE INVENTION

Modern telephone networks implementing automatic number identification (ANI) enable a called telephone to determine the number of a calling party and to take action based on the number. For example, some telephones enable the subscribing party to screen incoming telephone calls based on the caller ID number. The called party may elect to either accept or reject an incoming call based on the number of the calling party. Also, the called party may elect to divert calls from selected numbers to a recording device, such as a voice mail box or answering machine, for later retrieval by the called party.

When calls are diverted to a voice mail box or answering machine, they are presumably returned at a later date by the party who received the original call. If the original calling party, who is the called party on the return call, also uses call screening, the return call may be blocked or diverted to a voice mail box. This results in a state of "perpetual telephone tag" since both parties have calls from the other party screened.

Accordingly, there is a need for an adaptive call-screening method that avoids the telephone tag pitfall when the calling party and the called party each have calls from the other party screened.

SUMMARY OF THE INVENTION

The present invention is an adaptive call-screening method for use in a telephone having call-screening capability. According to the present invention, a call-screening database is stored in memory in the telephone. Incoming calls are accepted, rejected, or diverted to a recording device based on the entries in the call-screening database. The call-screening database is automatically updated in response to the placement of a call to a previously screened number when specified conditions are met so that calls can be received from the previously screened number. The updates to the call-screening database expire after a predetermined time period has elapsed. Also, the update may be cancelled once a return call is received.

In one embodiment of the invention, the call-screening database is updated when a call is placed to a number that is currently screened to temporarily accept incoming calls from such number. For example, if a user places a call to a number which is currently blocked or diverted by the calling party, the call-screening database is updated to place the number on an accept list. The update expires after a predetermined time period if no return call is made.

In another embodiment of the invention, the call-screening database is updated only when the calling party's call is blocked or diverted at the receiving party's end. The telephone automatically detects a beep tone indicative of an answering machine or voice mail system, or a systematic voice pattern indicative of a pre-recorded message. If a beep tone or pre-recorded message is detected, the call-screening database is updated so that any return call from the called party will be received. If the call is answered, no update is made to the call-screening database.

In another embodiment of the invention, the phone keeps a record of recently blocked or diverted calls. When the user places a call, the called number is compared to the numbers in the call record of recently blocked or diverted calls. If the called number matches one of the numbers in the call record of recently blocked or diverted calls, it is assumed that the user wants to accept calls from that number and the call-screening database is automatically updated. Again, the update expires after a predetermined time period, or upon the occurrence of predetermined conditions. Thus, calls will be temporarily received from the called party, whose prior calls had been blocked or diverted.

The present invention overcomes some of the pitfalls that might befall those who use sophisticated call-screening features. In particular, the present invention avoids the problem of creating a "perpetual telephone tag" situation by adaptively updating the call-screening database in the telephone, while preserving many of the advantages of advanced call-screening features.

DETAILED DESCRIPTION OF THE INVENTION

Figure 1:
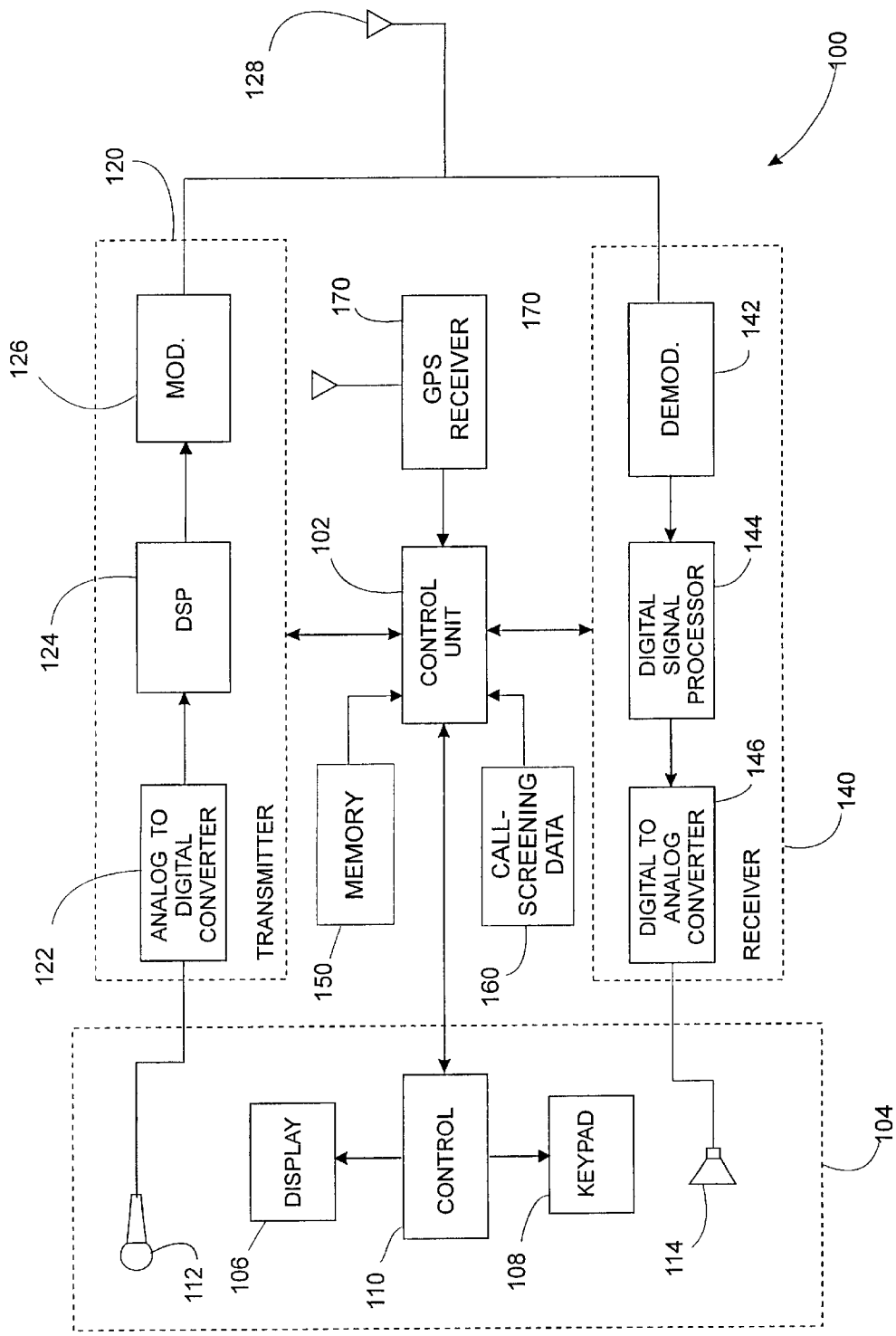
FIG. 1 is a schematic block diagram of a cellular telephone constructed in accordance with the present invention.

Referring now to the drawings, a telephone incorporating the call-screening method of the present invention is shown and indicated generally by the numeral 100. The particular embodiment shown is a digital cellular telephone 100 that implements the IS-136 standards published by the Telecommunications Industry Association (TIA). The present invention is not limited to cellular telephones or digital telephones, but may be implemented in standard land-line telephones, including key systems and public exchanges (PBXs), analog cellular telephones or any other communications device that has call-screening capability.

FIG. 1 is a block diagram showing one embodiment of a cellular telephone 100 having call-screening capability. The cellular telephone 100 is a fully functional radio transceiver capable of transmitting and receiving digital signals. The cellular telephone 100 includes a control unit or logic unit 102, an operator interface 104, a transmitter 120, a receiver 140, a non-volatile memory 150, a call-screening data memory 160, and a positioning receiver 170.

The operator interface 104 includes a display 106, keypad 108, control unit 110 microphone 112, and speaker 114. The display 106 allows the operator to see dialed digits, prompts, and call status information. The keypad 108 allows the operator to dial numbers, enter commands, and select options. The keypad 108 and display 106 are also used to enter call-screening data into the call-screening data memory 160. The control unit 110 interfaces the display 106 and keypad 108 with the control unit 102. The microphone 112 receives audio signals from the user and converts the audio signals to analog signals. Speaker 114 converts analog signals from the receiver 140 to audio signals that can be heard by the user.

The analog signals from the microphone 112 are applied to the transmitter 120. The transmitter 120 includes an analog-to-digital converter 122, a digital signal processor 124, and a modulator 126. The analog to digital converter 122 changes the analog signals from the microphone 112 into a digital signal. The digital signal is passed to the digital signal processor 124. The digital signal processor 124 compresses the digital signal and inserts error detection, error correction and signaling information. The compressed and encoded signal from the digital signal processor 124 is passed to the modulator 126. The modulator 126 converts the signal to a form that is suitable for transmission on a RF carrier.

The receiver 140 includes a demodulator 142, a digital signal processor 144, and a digital to analog converter 146. Received signals are passed to the demodulator 142 which extracts the transmitted bit sequence from the received signal. The demodulator 142 passes the demodulated signal to the digital signal processor 144 which decodes the signal, corrects channel-induced distortion, and performs error detection and correction. The digital signal processor 144 also separates control and signaling data from speech data. The control and signaling data is passed to the control unit 102. Speech data is processed by a speech decoder and passed to the digital-to-analog converter 146. The digital-to-analog converter 146 converts the speech data into an analog signal which is applied to the speaker 114 to generate audible signals which can be heard by the user.

The control unit 102 comprises one or more programmable logic devices, such as microprocessors. The control unit 102 directs and coordinates the operation of the transmitter 120 and the receiver 140. Memory 150 stores program instructions and data needed by the control unit 102 to control the telephone 100. The functions performed by the control unit 102 include power control, channel selection, timing, as well as a host of other functions. The control unit 102 inserts signaling messages into the transmitted signals and extracts signaling messages from the received signals. The control unit 102 responds to any base station commands contained in the signaling messages, and implements those commands. When the user enters commands via the keypad 108, the commands are transferred to the control unit 102 for action.

The positioning receiver 170 receives signals from a space-based or land-based station that transmits positioning data. For example, the positioning receiver 170 could be a GPS receiver. The received data is passed to the control unit 102 which uses the information to calculate the geographic location of the communication terminal 100. The location can be used in determining whether to update the call-screening data. For example, updates may be allowed, or may be forbidden, when the user is in a certain geographic area.

The telephone 100 is programmed to implement call-screening based on the number of the calling party. The service provider transmits the number of the calling party, referred to herein as the caller ID number, to the called party. The telephone 100 can examine the caller ID number and either accept the call, reject the call, or divert the call to a voice mail system, answering machine, or other recording device based on the caller ID number. The control unit 102 can be programmed to perform the call-screening function as set forth more fully below. Alternatively, the call-screening functions be performed by a separate processor which may perform other functions as well as call-screening.

To implement call screening, a call-screening database is stored in a non-volatile call-screening data memory 160. The call-screening database may be an address space in memory 150, or may be a separate memory device. The call-screening database contains call-screening data used by the telephone 100 to screen incoming calls. As used herein, the term "screened call" refers to a call that has been rejected, blocked, or diverted. A "screened number" is a number from which a screened call originates. The call-screening data is placed in memory using the keypad 108 and display 106. Alternatively, the call-screening data can be downloaded from another device, or received via said receiver 140 over the air interface.

In one embodiment, the call-screening data includes an "accept list" which identifies numbers belonging to persons from whom the subscribing party wants to receive calls. A "divert list" contains a list of numbers belonging to persons from whom the subscribing party wants to record calls. The "accept list" and the "divert list" are used to screen incoming calls. Those skilled in the art will recognize that the structure of the call-screening database described herein is not itself material and that many different database structures can be used to obtain the same effect. For example, the "accept list" can be replaced by a "reject list." Also, those skilled in the art will recognize that the various screening lists (e.g. accept list, divert list, reject list, etc.) can be implemented using multiple tables in a database or as a single table. Both implementations are intended to be embraced by the claims.

Figure 2:
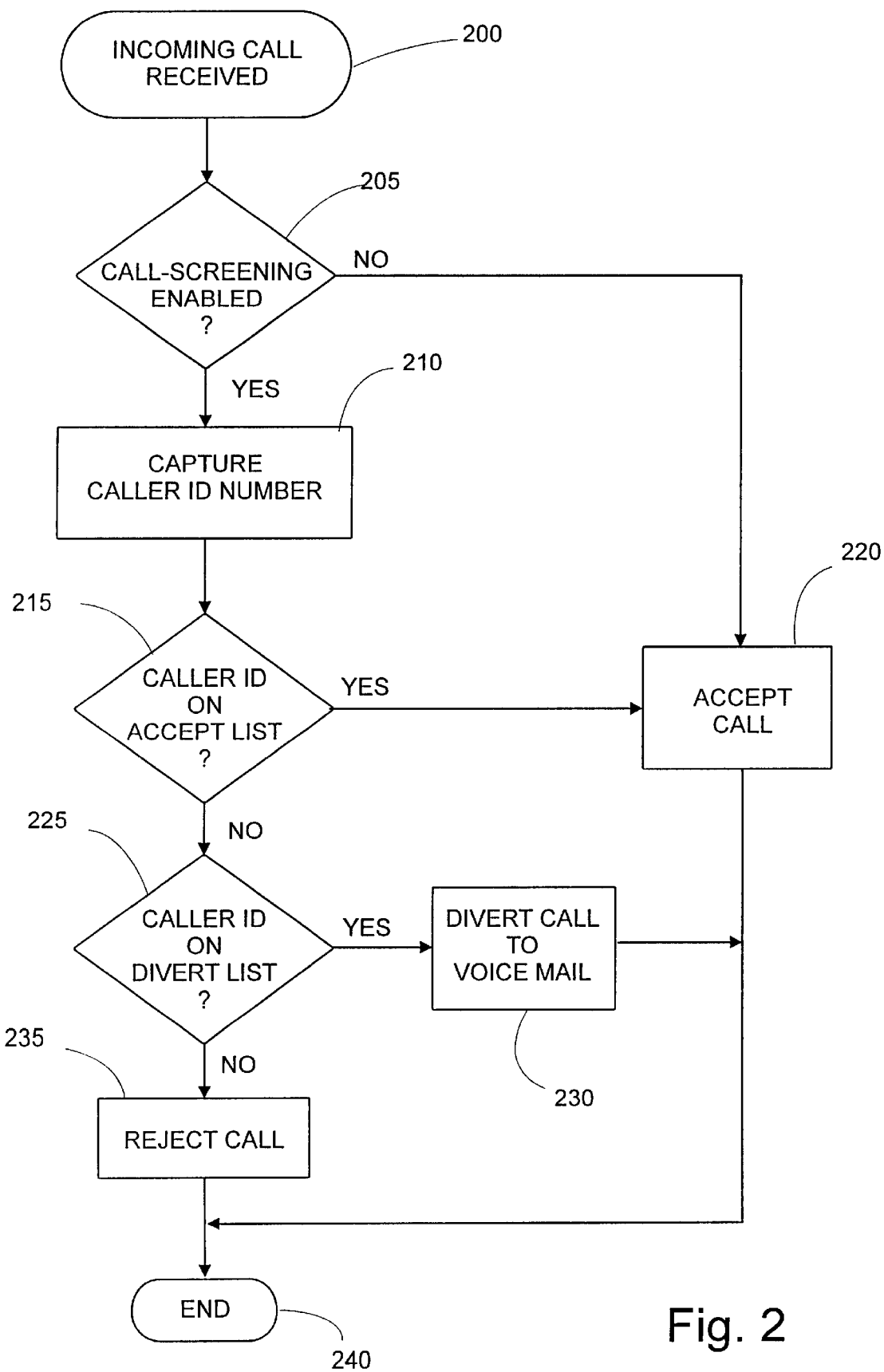
FIG. 2 is a flow diagram illustrating the call-screening procedure used by the telephone.

Referring now to FIG. 2, the call-screening procedure implemented by the telephone 100 of the present invention is shown. Upon receiving an incoming call (block 200), the control unit 102 determines first whether call-screening is enabled (block 205). If not, the telephone 100 accepts the call (block 220) and the call-screening procedure terminates (block 240). If call-screening is enabled, the telephone 100 captures the caller ID number of the calling party (block 210) and compares the caller ID number to the numbers in the "accept list" (block 215) and the "divert list" (block 225). If the number is on the "accept list", the call is accepted and the user is notified by ringing the phone 100 (block 220). If the number is on the "divert list", the call is diverted to either a voice mail box, answering machine, or other recording device (block 230). If desired, the user can be notified of diverted calls by ringing the phone to give the user the opportunity to answer the call. Calls from any number not appearing on the "accept list" or the "divert list" will be blocked (block 235).

A potential problem arises when call-screening is used to screen incoming calls. If party A screens calls from party B, and party B screens calls from party A, then neither party will be able to reach the other party. The result will be a perpetual telephone tag situation where calls from each party to the other are repeatedly screened. Thus, the parties will be forced to leave messages on the other party's voice mail or answering machine. At present, the only solution to this telephone tag problem is to manually update the call-screening database.

The telephone 100 of the present invention implements an adaptive call-screening method that will automatically update the call-screening database :when a call is made to a screened number when predetermined conditions are satisfied. For example, when a call is placed to a previously screened number, the call-screening database is automatically updated so that calls can be temporarily received from the called party for a predetermined period of time. Also, the telephone 100 can be programmed to automatically update the call-screening database when a call is diverted at the receiving end to an answering machine or voice mailbox, or when returning a previously diverted call.

Figure 3:
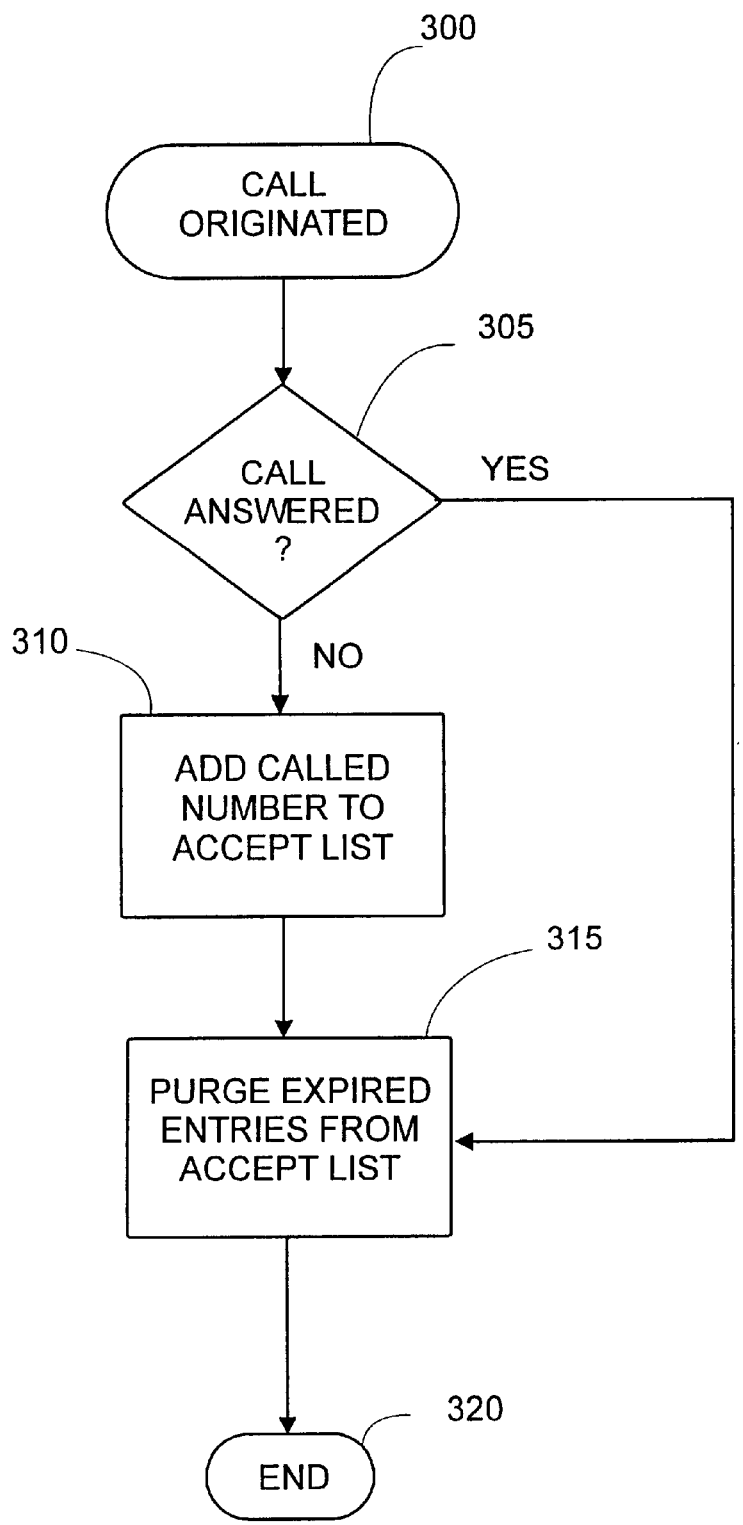
FIG. 3 is a flow diagram illustrating an update procedure used by the telephone to automatically update the call-screening database when a call to a previously screened number is unanswered.

FIG. 3 is a flow diagram of an update procedure invoked by the telephone to automatically update the call-screening database when an unanswered call is placed by the user to a screened number. When the user originates or places a call to the previously screened number (block 300), the phone initially waits until a connection is established (block 305). A connection is established when the call is answered at the receiving end. If the call is answered, the call-screening database is not updated since the called party was reached. The expired entries in the call-screening database are purged (block 315) and the update procedure is terminated without updating the call-screening database (block 320). If the call is not answered, the call-screening database is automatically updated to add the called number, which was previously screened, and the time of the call to the "accept list" (block 310). The same result can be obtained using a "reject list" by removing or flaggin entries in the "reject list." Any expired updates are then purged (block 315) and the update procedure terminates (block 320).

It may not be desirable to add every called number to the accept list. Therefore, the conditions for updating the call-screening database can be more narrowly defined. For example, in one embodiment of the invention, the call-screening database is updated only when a connection is made to a voice mail system, answering machine, or other recording device. In another embodiment, the call-screening database is updated only when the user places a return call to a person whose call was previously blocked or diverted.

Figure 4:
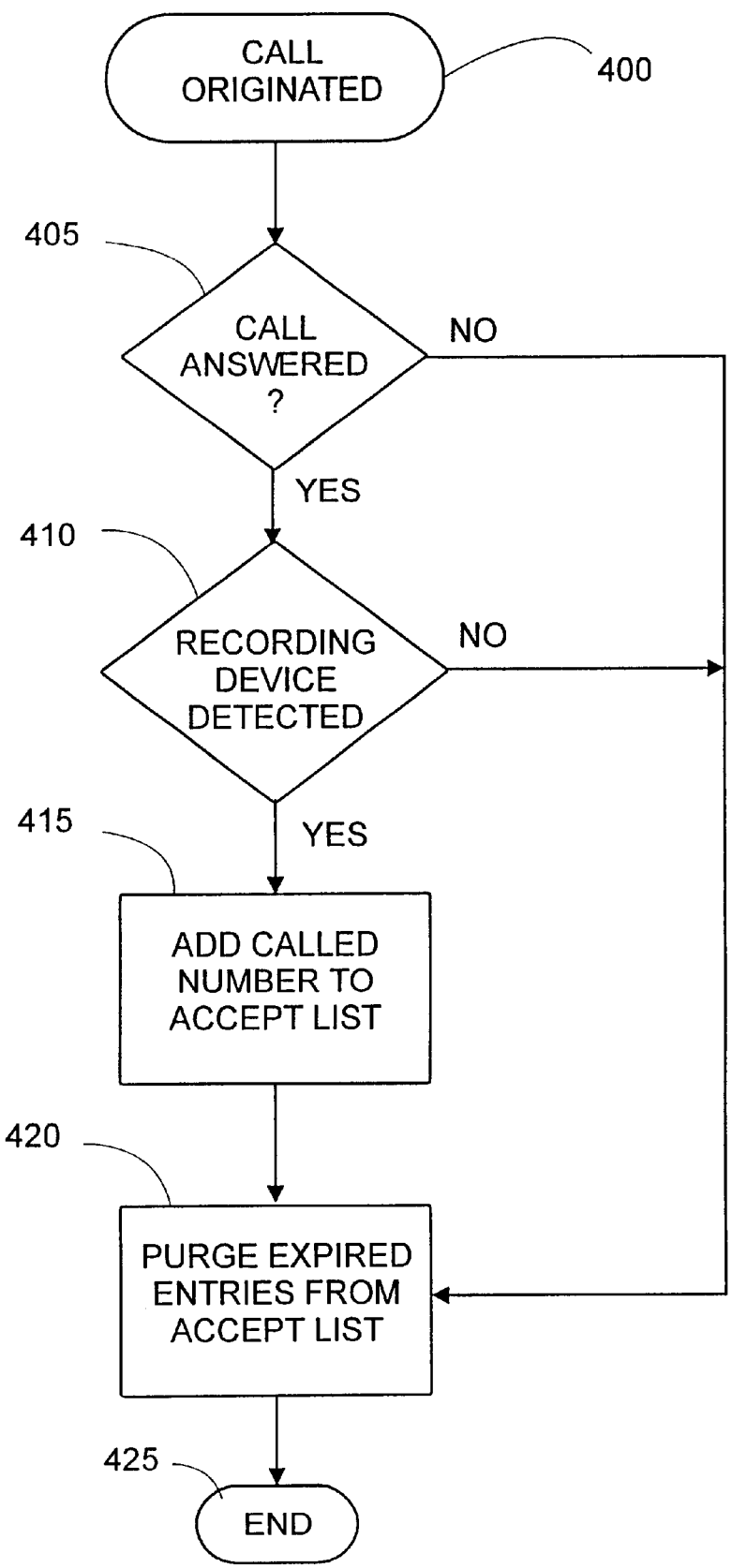
FIG. 4 is a flow diagram illustrating an updating procedure for automatically updating the call-screening database when a call to a previously screened number is diverted at the receiving end to a recording device.

FIG. 4 is a flow diagram illustrating an update procedure in which updates to the call-screening database are conditioned on connection to an answering machine, voice mail, or other recording device. When the user originates or places a call (block 400), the phone initially waits until a connection is established (block 405). If the called is not answered, the expired entries in the call-screening database are purged (block 420) and the update procedure is terminated without updating the call-screening database (block 425). If the call is answered, the phone 100 determines whether the call was answered by a person or by a recording device (block 410). If the call is answered by a person, the call-screening database is not updated. In that case, the phone 100 will purge expired entries in the call-screening database (block 420) and then terminate the update procedure (block 425). If the call is answered by a recording device, the call-screening database is automatically updated to add the called number and the time of the call to the "accept list" (block 415). After updating the call-screening database, any expired updates are then purged (block 420) and the update procedure terminates (block 425).

Figure 5:
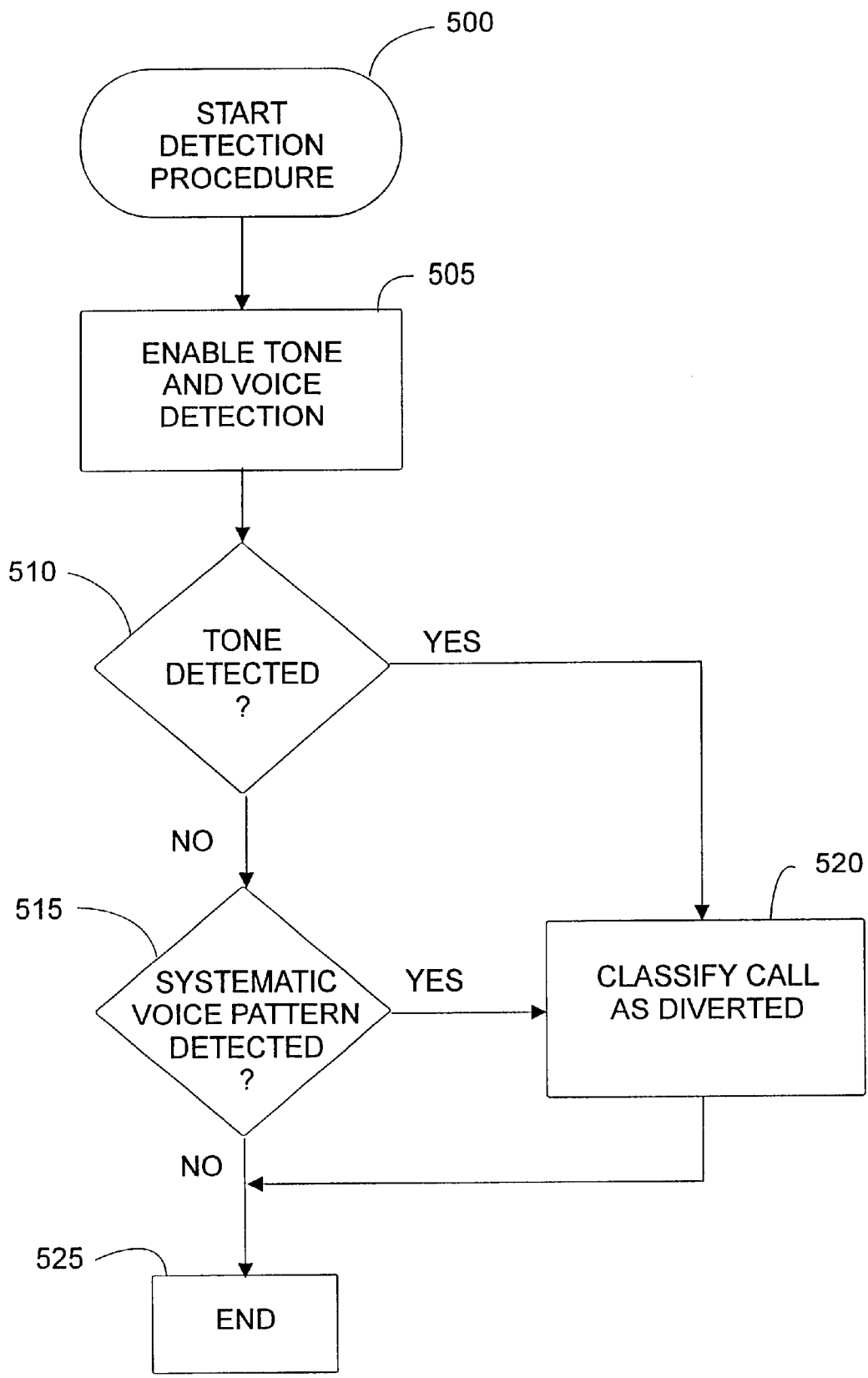
FIG. 5 is a flow diagram illustrating a detection procedure used by the telephone to detect a recording device at the receiving end of a call.

FIG. 5 is a flow diagram illustrating one method of detecting a recording device at the receiving end of a call. This procedure is called by the update procedure shown in FIG. 4 (block 410). When the detection procedure is invoked (block 500), the telephone 100 enables tone detection and voice detection (block 505), which may operate simultaneously. Tone detection and/or voice detection can be performed by the phone's digital signal processor 144, by the control unit 102, or by a dedicated processor. If a beep tone is detected (block 510), or a systematic voice pattern is detected indicative of a recorded voice (block 515), the call is classified as diverted (block 520) and control returns to the calling procedure. A systematic voice pattern typically begins with sustained voice activity at the receiving end with an absence of activity at the originating end (a recording is played), followed by sustained activity at the originating end followed by an absence of activity at the receiving end (the caller leaves a message). The voice detection algorithm does not need to be unfailingly accurate since an occasional error will not significantly diminish the utility of the invention. The calling procedure then updates the call-screening database as previously described.

Figure 6:
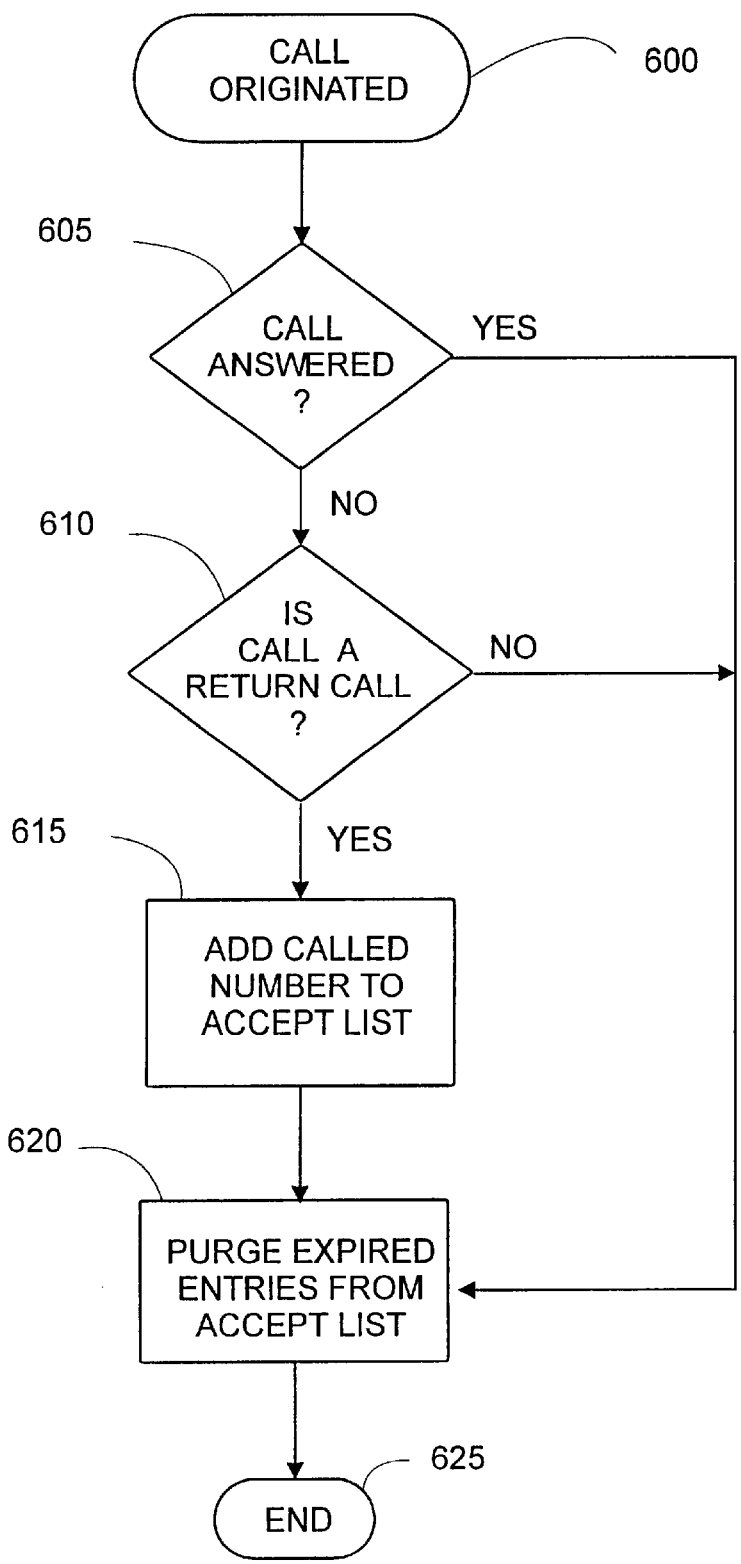
FIG. 6 is a flow diagram illustrating an update procedure for automatically updating the call-screening database when a return call is made by the user to a previously screened number.

FIG. 6 is a flow diagram illustrating the call-screening method when updates are conditioned on the placement of a return call by the user to a screened number. When the user originates or places the call (block 600), the telephone 100 waits for a predetermined time period, or until the call is answered (block 605). If the call is answered, the telephone 100 purges the expired entries from the database (block 620) and the update procedure terminates (block 625). If the call is not answered, the telephone 100 determines whether the call is a return call to a number that was previously diverted at the calling party's end (block 610). To facilitate this determination, the call-screening database 160 will include a table or other records of recently blocked or diverted calls. If the call is not a return call, the telephone 100 purges expired entries from the database (block 620) and terminates the update procedure (block 625). If the call is a return call, the telephone 100 adds the called number and the time of the call to the "accept" list (block 615). After updating the "accept" list, the telephone 100 purges expired entries from the database (block 620) and terminates the update procedure (block 625).

Figure 7:
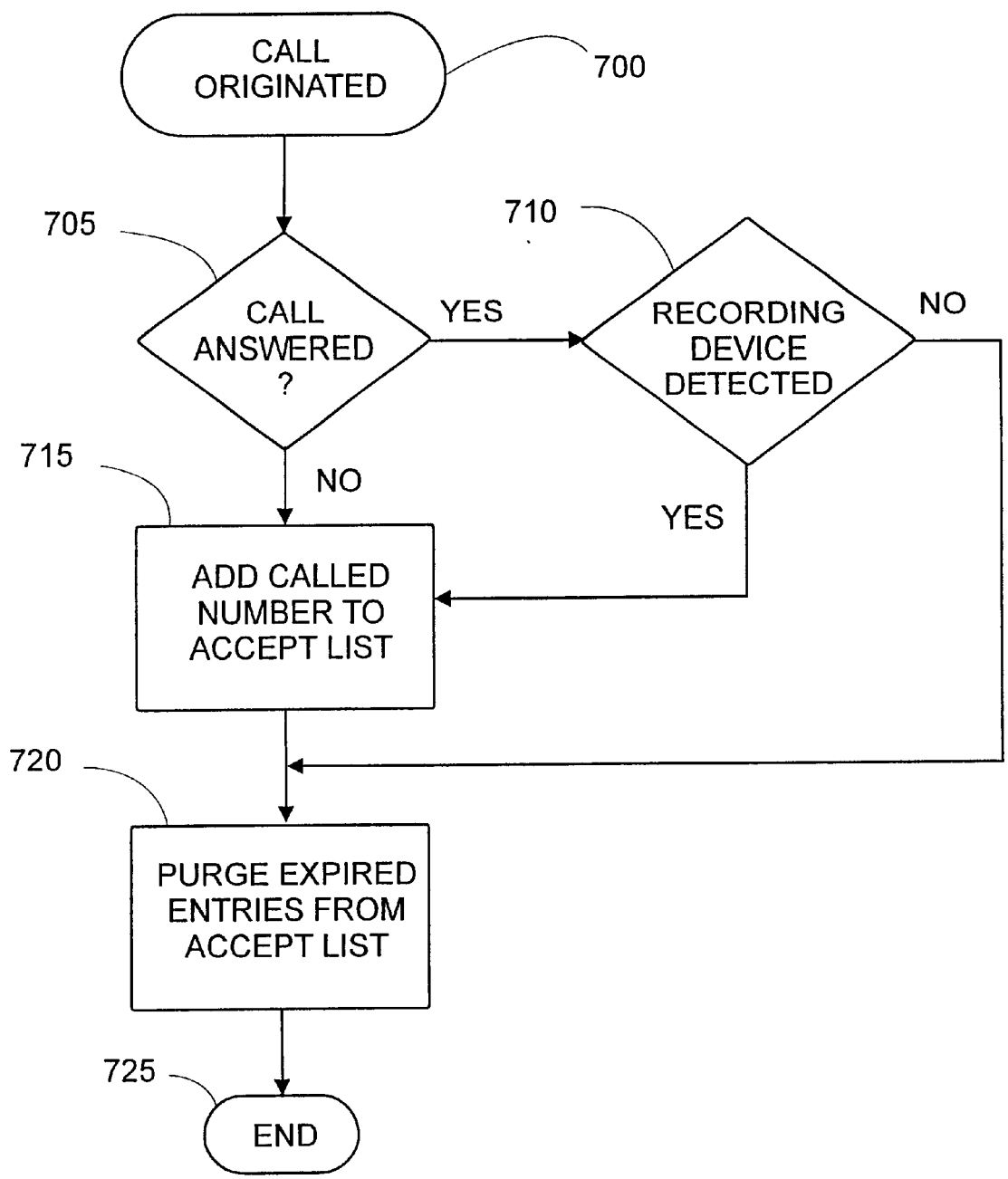
FIG. 7 is a flow diagram illustrating an update procedure for automatically updating the call-screening database when a call to a previously screened number is unanswered or diverted to a recording device.

FIG. 7 is a flow diagram illustrating an update procedure that updates the call-screening database when the call is unanswered or diverted to a recording device. When the user originates or places a call (block 700), the phone initially waits until a connection is established (block 705). If the call is not answered, the call-screening database is automatically updated to add the called number (block 715). Expired entries in the call-screening database are then purged (block 720) and the call is terminated (block 725). If the call is answered, the phone 100 tries to detect whether the call is answered by a person or by a recording device or answering machine (block 710). For example, the telephone 10 may detect a beep tone that is typical for an answering machine, or a systematic voice pattern that is indicative of a recording. If a live connection is made, meaning that a person answered the phone at the receiving end rather than a recording device, then any expired updates are purged (block 720) and the update procedure terminates (block 725) without making any updates to the call-screening database. If an answering machine or other recording device at the receiving end is detected, the call-screening database is automatically updated to add the called number and the time of the call to the "accept list" (block 715). Expired entries are then purged from the database (block 720) and the update procedure terminates (block 725).

The examples set forth in this disclosure are meant to be illustrative of the different ways in which the call-screening method can be implemented and are not intended to be limiting. The key aspect is that updates can be made automatically upon the occurrence of certain specified events without user intervention, other than placing a call. Those skilled in the art will recognize that the conditions that can be specified for automatically updating the call-screening database are unlimited. For example, updates to the call-screening database may be permitted only during certain specified hours (e.g., between 8:00 a.m. and 5:00 p.m.) or when specified proximity criteria are met. Other modifications can also be made. For example, the call-screening database may include a flag associated with each entry that determines whether updates to that entry are permitted. Variations to the call-screening method are virtually limitless. The key feature of the invention is that the call-screening database is updated in response to the placement of a call by the user when certain predetermined conditions are satisfied.

What is claimed is:

1. A telephone having call-screening capabilities, comprising:
   a. a memory for storing call-screening data used by said telephone to screen incoming calls from selected numbers;
   b. programmable logic for automatically updating said call-screening data when a call is made to a previously screened number so that calls from said previously screened number will be accepted.

2. The telephone according to claim 1 wherein said call-screening data includes an accepted number list, and wherein said logic is programmed to accept calls from numbers on said accepted number list.

3. The telephone according to claim 2 wherein said logic is programmed to add a previously screened number to said accepted number list when a call is made to said previously screened number.

4. The telephone according to claim 2 wherein said logic is programmed to add a previously screened number to said accepted number list when a call made to said previously screened number is unanswered.

5. The telephone according to claim 2 wherein said logic is programmed to add a previously screened number to said accepted number list when a call made to said previously screened number is diverted at the receiving end to a recording device.

6. The telephone according to claim 2 wherein said call-screening data includes a list of diverted numbers and wherein said logic is programmed to divert calls from said diverted numbers to a recording device.

7. The telephone according claim 1 wherein said call-screening data includes a screened number list for numbers to be screened, and wherein said logic is programmed to screen calls from said screened number list.

8. The telephone according to claim 7 wherein said logic is programmed to remove a previously screened number from said screened number list when a call is placed by the user to said previously screened number.

9. The telephone according to claim 7 wherein said logic is programmed to remove a previously screened number from said screened number list when a call placed by the user to said previously screened number is unanswered.

10. The telephone according to claim 7 wherein said logic is programmed to remove a previously screened number to said screened number list when a call placed by the user to said previously screened number is diverted at the receiving end to a recording device.

11. The telephone according to claim 7 wherein said screened number list includes a rejected number list and a diverted number list.

12. The telephone according to claim 11 wherein said logic is programmed to divert calls from numbers on said diverted number list to a recording device.

13. The telephone according to claim 11 wherein said logic is programmed to reject calls from numbers on said rejected number list.

14. The telephone according claim 1 wherein said logic is programmed to purge updates to said call-screening data when predetermined conditions are met.

15. The telephone according to claim 14 wherein said logic is programmed to purge updates to said call-screening data when a predetermined period of time has elapsed from the time the update was made.

16. A call screening method for a telephone having call-screening capability, comprising:
   a. storing call-screening data in a memory;
   b. screening incoming calls to said telephone based on said call-screening data so that calls from selected numbers are screened;
   c. updating said call-screening data in response to a call being made to a screened number so that calls can be received from said screened number.

17. The call-screening method according to claim 16 wherein said telephone updates said call-screening data by modifying the status of said screened number.

18. The call-screening method according to claim 16 wherein said call-screening data includes one or more screening lists, and wherein said telephone updates said call-screening data by adding, deleting, and modifying entries to said screening lists.

19. The call-screening method according to claim 18 wherein updates to said screening lists are purged after predetermined conditions are satisfied.

20. The call-screening method according to claim 19 wherein updates to said screening lists are purged after a predetermined time period has elapsed from the time of the update.

21. The call-screening method according to claim 16 wherein said call-screening data is updated when a call to a previously screened number is unanswered.

22. The call-screening method according to claim 16 wherein said call-screening data is updated when a call to said previously screened number is answered by a recording device.

23. The call-screening method according to claim 16 wherein said call-screening data is updated when a return call is made to a number from which an earlier call was blocked.

* * * * *